United States Patent [19]
Kitao et al.

[11] 4,449,516
[45] May 22, 1984

[54] SUNLIGHT-ENERGY-STORING METHOD

[75] Inventors: Teijiro Kitao, Tondabayashi; Jun-ichiro Setsune, Sakai; Shoichi Ishihara, Katano; Ryoichi Yamamoto, Neyagawa, all of Japan

[73] Assignee: Matsushita Electric Industrial Co., Ltd., Kadoma, Japan

[21] Appl. No.: 460,897

[22] Filed: Jan. 25, 1983

[30] Foreign Application Priority Data

Jan. 29, 1982 [JP] Japan .................................. 57-13910

[51] Int. Cl.³ .............................................. F24J 3/02
[52] U.S. Cl. ................................. 126/430; 204/158 R; 126/900; 126/400; 432/1
[58] Field of Search ........................ 126/400, 900, 430; 165/DIG. 4; 204/158 R; 237/1; 432/1, 18 L, 81; 250/492 R; 252/70

[56] References Cited
U.S. PATENT DOCUMENTS 3,994,675 11/1976 Sasse et al. .............................. 432/1
4,123,219 10/1978 Sasse et al. .............................. 432/1

FOREIGN PATENT DOCUMENTS 53-64833 6/1978 Japan .................................... 252/70

OTHER PUBLICATIONS

Chemical Abstracts, vol. 96, 1982, No. 60783.

Primary Examiner—R. L. Andrews
Assistant Examiner—Terryence Chapman
Attorney, Agent, or Firm—Stevens, Davis, Miller & Mosher

[57] ABSTRACT

This invention is a method for storing light energy using an indigo derivative. Among indigo derivatives capable of storing light energy by the photoisomerization of the molecule from the trans-form to the cis-form, compounds heretofore obtained have been soluble only in expensive solvents such as benzene, toluene, chloroform, carbon tetrachloride and the like and harmful substances.

On the other hand, the indigo derivative of this invention has the form of a pyridinium salt, is soluble in water and/or ethanol, and permits employment of safe and inexpensive water and/or an alcohol as a solvent.

The indigo derivative of this invention converted from the trans-form to the cis-form by irradiation with sunlight and storing sunlight energy liberates the aforesaid stored energy as heat on addition of a catalyst and/or a heat trigger.

7 Claims, 1 Drawing Figure

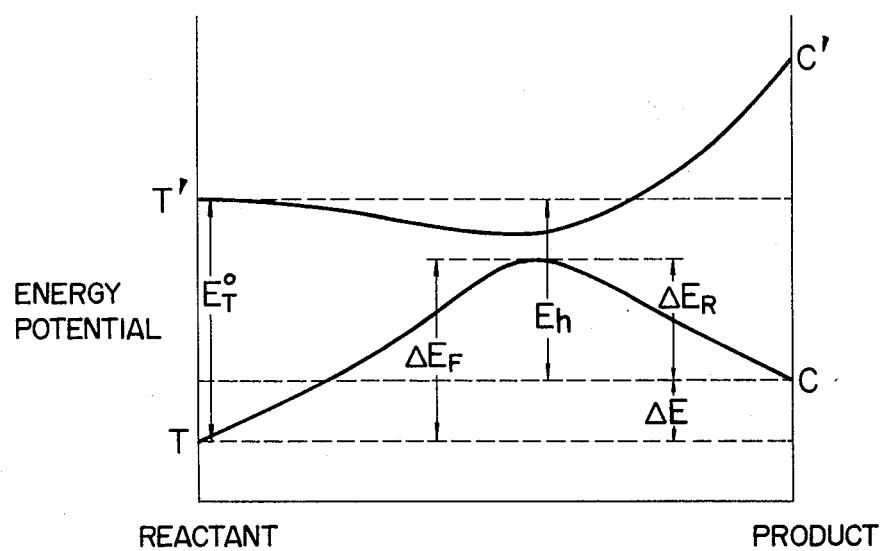
FIG.

SUNLIGHT-ENERGY-STORING METHOD

This invention relates to indigo derivatives which undergo photoisomerization and to a method for storing sunlight energy by utilizing them.

Studies of the utilization of solar energy have heretofore been made with zeal from the viewpoint of a clean and inexhaustible energy source. In general, as methods for utilizing solar energy, there may be exemplified, for example, (1) the utilization of solar heat, (2) the utilization of sunlight, and (3) methods by which solar energy is converted into other natural energy and then utilized as wind power, temperature difference of the sea, or biomass. Among them, studies of biomass and the chemical storage of light energy are noted as methods by which solar energy can be collected and then stored for a long time by a simple method.

Methods for chemical storage of light energy can roughly be classified into (1) energy conversion by photodissociation, (2) energy storage by the photoisomerization between the trans-form and the cis-form of an olefin, (3) energy storage by the intramolecular photocycloaddition of a $\pi$-electron system, and (4) energy storage by extraction of hydrogen from water.

BRIEF EXPLANATION OF DRAWING

The drawing illustrates the principle of energy storage by the photoisomerization between the trans-form and the cis-form of an olefin.

T ... trans-isomer, C ... cis-isomer, T' ... trans-isomer excited into a high-energy state, C' ... cis-isomer excited into a high-energy state, $\Delta E$ ... storable energy, $\Delta E_R$ ... activation energy from cis-isomer to trans-isomer, $\Delta E_F$ ... activation energy from trans-isomer to cis-isomer, $E \cdot T$ ... excitation energy for trans-isomer.

Among the methods described above, the energy storage by the photoisomerization between the trans-form and the cis-form of an olefin is explained below referring to the drawing. The trans-isomer (T), which is at a lower energy level and is thermodynamically stable, absorbs solar energy to be excited into a high-energy state (T') electronically. Energy ($E \cdot T$) necessary for the excitation is higher than ($\Delta E_F$), but is desired to be as low as possible for the purpose of effective utilization of the infrared region of solar spectrum.

T' liberates heat ($E_h$) readily, is at an energy level higher than that of T, and changes into the cis-isomer (C) which is thermodynamically more unstable. The difference in energy level between the trans-isomer (T) and the cis-isomer (C) in this case is storable energy ($\Delta E$). In order to liberate the stored energy ($\Delta E$) as heat, there is a method by which a heat trigger is supplied and a method using a catalyst. In the case of the former, the stored energy ($\Delta E$) can be recovered by supplying the cis-isomer (C) with heat energy higher than the reverse activation energy ($\Delta E_R$). In the case of the latter, the catalyst lowers $\Delta E_R$ and makes the reverse reaction from (C) to (T) liable to occur, whereby ($\Delta E$) can be recovered. As the catalyst, many are known including neutral deactivated alumina, barium oxide, lead oxide, zinc oxide, p-toluenesulfonic acid, etc. (C') in the drawing shows the cis-isomer excited into a high-energy state.

As described above, as to energy storage by the photoisomerization between the trans-form and the cis-form of an olefin, the principle itself is well known, and the kind of the olefin and an energy-recovering apparatus have already been proposed [Japanese Patent Application Kokai (Laid-Open) Nos. 80,278/77 and 65,265/78]. However, these conventional methods have been disadvantageous in that olefins must be dissolved in an expensive solvent such as benzene, toluene, chloroform, carbon tetrachloride or the like or in a harmful substance. There have also been proposed, at the same time, the idea that a water-soluble group such as —$SO_3H$, —OH, —COOH or the like is introduced into olefins and that safe and inexpensive water is used as a solvent. However, there are many compounds which are difficult to synthesize, and there has heretofore been synthesized and isolated no water-soluble compound capable of collecting sunlight energy by the trans-to-cis isomerization of the molecule.

As olefins which collect sunlight energy by trans-to-cis isomerization, there are known many materials such as stilbene, azobenzene, indigo, thioindigo, and cyanine dyes. Indigo and cyanine dyes are preferred because their deterioration by light is slight and their absorption spectra are similar to the solar spectrum.

In general, representative indigo dyes having the ability to store energy have the following structural formula:

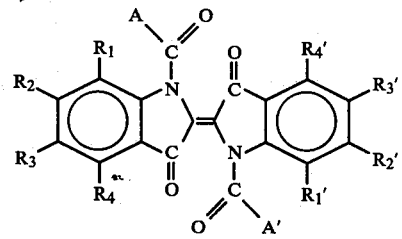

In the above formula, A and A' are individually lower alkyl, haloalkyl, aryl or haloaryl, and $R_1$, $R'_1$, $R_2$, $R'_2$, $R_3$, $R'_3$, $R_4$ and $R'_4$ are individually hydrogen, alkyl, aryl, alkoxy, aryloxy, halogen, alkoyl, aroyl or a combination thereof. For example, N,N'-diacetyl indigo has an energy-storing ability of 34.5 KJ/mol, N,N'-bis(-monochloroacetyl)indigo has that of 48 KJ/mol, and N,N'-diisobutyrylindigo has that of 41 KJ/mol.

However, all of these compounds are insoluble in water, and undergo photoisomerization only in expensive solvents such as benzene, toluene, chloroform, carbon tetrachloride and the like and harmful substances.

In view of the prior arts described above, this invention provides water- or alcohol-soluble indigo derivatives requiring no employment of expensive solvents and harmful substances and a sunlight-energy-storing method utilizing the properties thereof.

The present invention is firstly a compound which collects sunlight energy by the trans-to-cis isomerization of the molecule and liberates the collected energy as heat on addition of a catalyst and/or a heat trigger at a time when the energy is needed, and secondly a method for storing sunlight energy. The trans-isomer of the aforesaid compound has the structure shown below and is soluble in water or in an alcohol.

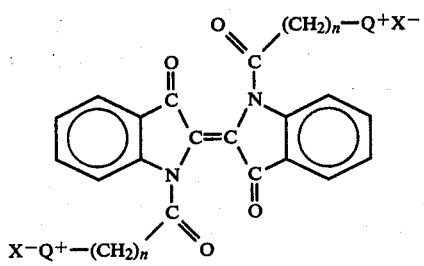

In the formula, n is zero or an integer of 1 or larger, but is preferably an integer of 5 or smaller for practical purposes, for example, because in general, with the increase in the value of n, the synthesis of the compound becomes difficult and the rate of thermal isomerization from the cis-isomer to the trans-isomer increases. $X^-$ may be any monovalent anion represented by halogens but is more preferably a bulky anion such as $ClO_4^-$, $CH_3SO_4^-$ or the like. Q is a specific nitrogen-containing heterocyclic ring which together with the monovalent action ($X^-$) has the following fundamental coordination:

and imparts water- and/or alcohol-solubility.

This invention is explained below in detail by referring to Examples.

EXAMPLE 1

There was synthesized an indigo derivative whose trans-form had the following structural formula:

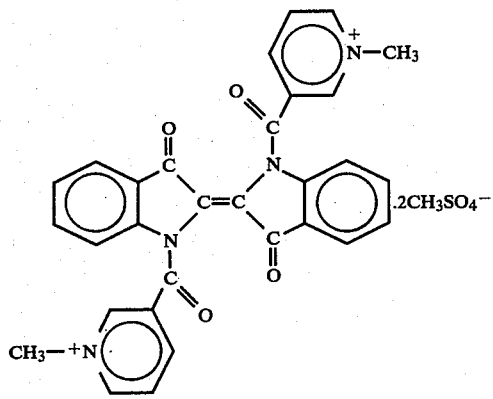

This compound was soluble in ethanol, and it was confirmed that the compound underwent isomerization from the trans-form to the cis-form on irradiation with visible rays in ethanol solution.

It was also confirmed that the resulting cis-isomer reverted to the trans-form on addition of a catalyst such as diethylamine, p-toluenesulfonic acid or the like. The solubility of the compound in ethanol at room temperature was about 10 g/liter.

Conventional sunlight-energy-storing materials such as N,N'-diacetylindigo, N,N'-dibenzoylindigo and the like are hardly soluble in ethanol and do not undergo photoisomerization in ethanol solution, while the compound obtained in the present example is of very great practical value, for example, in that it is soluble in inexpensive ethanol and can collect sunlight energy by the trans-to-cis isomerization of the molecule in ethanol solution.

A process for synthesizing the compound synthesized in the present example is shown below. In a 100 ml eggplant shaped flask were placed 0.004 mol of indigo and 0.04 mol of the nicotinic acid chloride hydrochloride. Thereto was added 20 ml of pyridine, after which the flask was equipped with a Dimroth condenser and a calcium chloride tube, and the contents of the flask were stirred for about 3 hours on an oil bath at an oil bath temperature of 80° to 90° C. Next, the contents were allowed to cool to room temperature, and then the solids were removed by suction filtration. After the thus obtained pyridine solution was poured into 1.5 liters of water, the resulting product was extracted therefrom with chloroform.

The chloroform solution obtained by the extraction was washed with water and dried. Then the chloroform and the residual pyridine were removed under a reduced pressure to obtain a purply red solid. Subsequently, the solid was dissolved in chloroform and subjected to column chromatography development by using silica gel as an adsorbent, and the red portion was separated. The chloroform was removed from the thus obtained red solution under a reduced pressure to obtain 560 mg of N,N'-dinicotinoylindigo.

Next, 5 ml of dimethylsulfuric acid was added to 400 mg of the N,N'-dinicotinoylindigo, and a vessel containing them was equipped with a Dimroth condenser and a calcium chloride tube, after which the contents were stirred for about 15 minutes at an oil bath temperature of 70° C. Thereafter, the dimethylsulfuric acid was removed under a reduced pressure, and decantation was carried out several times by using ether. Red crystals obtained at this time were the pyridinium salt of N,N'-bis(N-methylnicotinoyl)indigo, and the yield in the reaction was 90% or higher.

In 1 liter of ethanol was dissolved 0.6 g of the aforesaid pyridinium salt synthesized in the manner described above to obtain a homogeneous solution. When the solution was irradiated with light from a halogen lamp through an aqueous potassium dichromate solution filter for about 1 hour, 60% of the pyridinium salt underwent isomerization from the trans-form to the cis-form. Thereafter, the heat of isomerization of the aforesaid pyridinium salt was measured by using a Twin-type Isoperibol Calorimeter TIC-211 manufactured by Tokyo Riko Co., Ltd.

In this example, the isomerization from the cis-form to the trans-form was effected by adding, as a catalyst, ethanol containing hydrochloric acid. The percentages of the cis-isomer of the pyridinium salt before and after the addition of the catalyst were 50% and 12%, respectively, and it can be considered that the difference between them of 38% contributed to the generation of heat.

The measured heat of isomerization was 1.46 J (as corrected for the quantity of heat due to the addition of the catalyst) per 100 ml of the solution. Therefore, the heat of isomerization of the pyridinium salt synthesized in the present example is about 46 KJ per mol and it can be seen that like conventional N,N'-diacylindigos, the pyridinium salt has a large quantity of heat of isomerization.

EXAMPLE 2

There was synthesized an indigo derivative whose trans-form had the following structural formula:

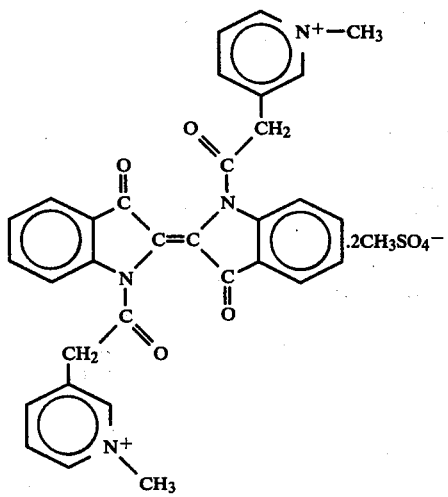

This compound was soluble in water, and it was confirmed that the compound underwent isomerization from the trans-form to the cis-form when an aqueous solution thereof was irradiated with visible rays. It was also confirmed that the resulting cis-isomer reverted to the trans-form on addition of a catalyst such as p-toluenesulfonic acid or the like. The solubility of the compound in water at room temperature was about 8 g/liter.

Conventional sunlight-energy-storing materials such as N,N'-diacetylindigo, N,N'-dibenzoylindigo and the like are insoluble in water, while the sunlight-energy-storing material according to the present example is of very great practical value, for example, in that safe and inexpensive water can be used as a solvent.

A process for synthesizing the compound synthesized in the present example is shown below. A 300 ml eggplant-shaped flask was equipped with a Dimroth condenser, a calcium chloride tube and a dropping funnel, and in the flask, 0.7 mol of thionyl chloride was slowly dropped to 0.1 mol of ε-homonicotinic acid (pyridine-3-acetic acid) with stirring at room temperature. After completion of the dropping, the resulting mixture was stirred continuously for 1 hour on an oil bath at an oil bath temperature of 60° C. Thereafter, the excess thionyl chloride was removed under a reduced pressure to obtain ε-homonicotinic acid chloride.

Next, 0.004 mol of indigo and 0.04 mol of the ε-homonicotinic acid chloride obtained by the procedure described above were placed in a 100 ml eggplant shaped flask. Thereto was added 20 ml of pyridine, after which the flask was equipped with a Dimroth condenser and a calcium chloride tube, and the contents of the flask were stirred for about 3 hours on an oil bath at an oil bath temperature of 75 to 85° C. Subsequently, the contents were allowed to cool to room temperature, and then the solids were removed by suction filtration. To the thus obtained pyridine solution was added 1 liter of water, and the product N,N'-di-ε-homonicotinoylindigo was extracted therefrom with chloroform. The chloroform solution obtained by the extraction was washed with water and dried. Then the chloroform and the residual pyridine were removed under a reduced pressure to obtain a purply red solid. The solid was purified by column chromatography to obtain 980 mg of N,N'-di-ε-homonicotinoylindigo.

Next, 5 ml of dimethylsulfuric acid was added to 500 mg of the N,N'-di-ε-homonicotinoylindigo, and a vessel containing them was equipped with a Dimroth condenser and a calcium chloride tube, after which its contents were stirred for about 15 minutes on an oil bath at an oil bath temperature of 70° C. Thereafter, the dimethylsulfuric acid was removed under a reduced pressure, and decantation was carried out several times by using ether. The pyridinium salt of N,N'-bis(N-methyl-ε-homonicotinoyl)indigo could be obtained by separation by filtraion. The yield in the reaction in this case was 90% or higher.

In 1 liter of distilled water was dissolved 0.25 g of the aforesaid pyridinium salt synthesized in the manner described above to obtain a homogeneous solution. When the solution was irradiated with light from a halogen lamp through an aqueous potassium dichromate solution filter for about 1.5 hours, 76% of the pyridinium salt underwent isomerization from the trans-form to the cis-form. Thereafter, the irradiation with light was stopped, and the heat of isomerization of the aforesaid pyridinium salt was measured in the same manner as in Example 1 to find that heat was generated in a quantity of 42 KJ per mol.

EXAMPLE 3

There was synthesized an indigo derivative whose trans-form had the following structural formula:

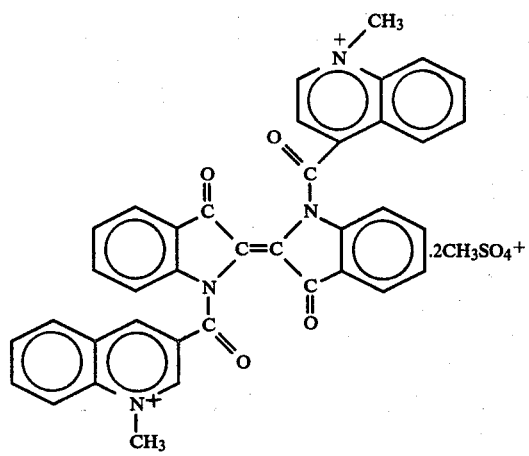

This compound was soluble in water, and it was confirmed that the compound underwent isomerization from the trans-form to the cis-form when an aqueous solution thereof was irradiated with visible rays. It was also confirmed that the resulting cis-isomer reverted to the trans-form on addition of a catalyst such as p-toluenesulfonic acid or the like. The solubility of the compound in water at room temperature was about 6.5 g/liter.

Conventional sunlight-energy-storing materials such as N,N'-diacetylindigo, N,N'-dibenzoylindigo and the like are insoluble in water, and many of them are low in solubility in organic solvents, while the indigo derivative according to this invention is of very great practical value, for example, in that safe and inexpensive water can be used as a solvent and that the solubility of the derivative in water is high.

A process for synthesizing the indigo derivative synthesized in the present example is shown below.

A 300 ml eggplant-shaped flask was equipped with a Dimroth condenser, a calcium chloride tube and a dropping funnel, and in the flask, 0.6 mol of thionyl chloride was slowly dropped to 0.1 mol of 3-quinolylcarboxylic acid with stirring at room temperature. After completion of the dropping, the resulting mixture was stirred continuously for about 1 hour on an oil bath at an oil bath temperature of 65° C. Thereafter, the excess thionyl chloride was removed under a reduced pressure to obtain 3-quinolylcarboxylic acid chloride.

Next, 0.004 mol of indigo and 0.04 mol of the 3-quinolylcarboxylic acid chloride were placed in a 100 ml eggplant-shaped flask. Thereto was added 20 ml of pyridine, after which the flask was equipped with a Dimroth condenser and a calcium chloride tube, and its contents were stirred for about 3 hours on an oil bath at an oil bath temperature of 75° to 85° C. Subsequently, the contents were allowed to cool to room temperature, and then the solids were removed by suction filtration. To the thus obtained pyridine solution was added 1 liter of water, and the resulting product was extracted therefrom with chloroform.

The chloroform solution obtained by the extraction was washed with water and dried. Then the chloroform and the residual pyridine were removed under a reduced pressure to obtain the product, purply red N,N'-bis(N-methyl-3-quinolyl)indigo. When it was purified by column chromatography, the yield was 1.05 g.

Next, 6 ml of dimethylsulfuric acid was added to 600 mg of the obtained N,N'-bis(N-methyl-3-quinolyl)indigo, and a vessel containing them was equipped with a Dimroth condenser and a calcium chloride tube, after which its contents were stirred for about 10 minutes on an oil bath at an oil bath temperature of 65° C. Thereafter, the dimethylsulfuric acid was removed under a reduced pressure, and decantation was carried out several times by using ether, after which the quinolinium salt of N,N'-bis(N-methyl-3-quinolyl)indigo was separated by filtration. The yield at this time was 80% or higher.

In 1 liter of distilled water was dissolved 260 mg of the quinolinium salt synthesized in the manner described above to obtain homogeneous solution. When the solution was irradiated with light from a halogen lamp through an aqueous potassium dichromate solution filter for about 1.5 hours, 65% of the quinolinium salt underwent isomerization from the trans-form to the cis-form. Thereafter, the irradiation with light was stopped, and the heat of isomerization of the aforesaid quinolinium salt was measured in the same manner as in Example 1 to find that heat was generated in a quantity of 50 KJ per mol.

Although a pyridyl group and a quinolyl group were used as the nitrogen-containing heterocyclic ring Q in the above examples, there may be selected as the heterocyclic ring Q at least one member from the group consisting of the above-mentioned two groups, a pyridazinyl group, a pyrimidinyl group, a pyrazinyl group, an N-alkylimidazoly group, an N-alkylpyrazolyl group, an oxazolyl group, an isoxazolyl group, a thiazolyl group, an isothiazolyl group, an isoquinolyl group, a cinnolinyl group, a quinoxalinyl group, an N-alkylbenzimidazolyl group, a benzoxazolyl group, a benzisoxazolyl group, a benzthiazolyl group, a benzisothiazolyl group, an N-alkylindazolyl group, an α-naphthoquinolyl group, a ε-naphthoquinolyl group, an acridinyl group, a naphthyridinyl group, a phenazinyl group, a purinyl group, a phenanthrolinyl group, a 4,4'-bipyridyl group a 2,2'-bipyridyl group, and derivatives of these groups. In the above structural formula, the benzene rings and/or the heterocyclic rings of indigo may be replaced by other substituents. Further, if necessary, sensitizers and fading-preventing agents may be added.

Although the storage of sunlight energy by use of an indigo derivative is described in this invention, the indigo derivative of this invention can also be utilized for photochromic display and as a memory element.

As described above, this invention is an indigo series compound having, as a constituent in its specific structural formula, at least one member selected from the group consisting of a certain kind of nitrogen-containing heterocyclic rings and derivatives thereof, and is the acquisition of a sunlight-energy-storing material which is easy to handle, by taking advantage of the trans-to-cis isomerization of said compound. That is to say, this invention permits employment of harmless and inexpensive water or an alcohol as a solvent, in contrast to conventional materials which require employment of an expensive solvent such as benzene, toluene, chloroform, carbon tetrachloride or the like or a harmful substance as a solvent.

What is claimed is:

1. A method for storing sunlight energy, which comprises exposing an indigo derivative whose trans-isomer has the stuctural formula:

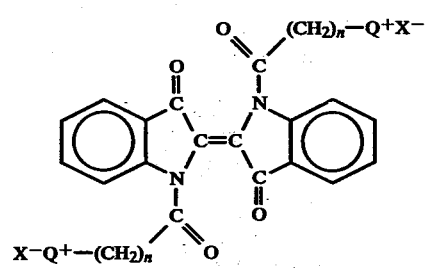

wherein n is zero or an integer of 1 or larger; X⁻ is a monovalent anion; and Q is a nitrogen-containing heterocyclic ring system comprising at least one member selected from the group consisting of a pyridyl group, a pyridazinyl group, a pyrimidinyl group, a pyrazinyl group, an N-alkylimidazolyl group, an N-alkylpyrazolyl group, an oxazolyl group, an isoxazolyl group, a thiazolyl group, an isothiazolyl group, a quinolyl group, an isoquinolyl group, a cinnolinyl group, a quinoxalinyl group an N-alkylbenzimidazolyl group, a benzoxazolyl group, a benzisoxazolyl group, a benzthiazolyl group, a benzisothiazolyl group, an N-alkylindazolyl group, an α-naphthoquinolyl group, a β-naphthoquinolyl group, an acridinyl group, a naphthyridinyl group, a phenazinyl group, a purinyl group, a phenanthrolinyl group, a 4,4-bipyridyl group, a 2,2-bipyridyl group and derivatives of the above-mentioned groups to sunlight in order to convert the trans-isomer into the cis-isomer, thus storing the aforesaid sunlight energy, and liberating the aforesaid collected energy as heat by the addition of a catalyst and/or a heat trigger.

2. The method as claimed in claim 1, wherein the indigo derivative is dissolved in a solvent.

3. The method as claimed in claim 2, wherein the solvent is alcohol or water.

4. The method as claimed in claim 1, wherein the catalyst comprises at least one member selected from the group consisting of diethylamine, p-toluenesulfonic acid and hydrochloric acid.

5. The method as claimed in claim 1, wherein n is less than or equal to 5.

6. The method as claimed in claim 1, wherein $X^-$ is $ClO_4^-$ or $CH_3SO_4^-$.

7. The method as claimed in claim 1, wherein Q is selected from the group consisting of a pyridyl group and a quinolyl group.

* * * * *